United States Patent
Moralez et al.

(10) Patent No.: US 8,507,615 B2
(45) Date of Patent: Aug. 13, 2013

(54) POLYIMIDE RESINS FOR HIGH TEMPERATURE WEAR APPLICATIONS

(75) Inventors: Jesus G Moralez, Wilmington, DE (US); Robert Ray Burch, Exton, PA (US); Timothy D. Krizan, Wilmington, DE (US); Lloyd Abrams, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/503,378

(22) PCT Filed: Oct. 27, 2010

(86) PCT No.: PCT/US2010/054226
§ 371 (c)(1),
(2), (4) Date: Apr. 23, 2012

(87) PCT Pub. No.: WO2011/056634
PCT Pub. Date: May 12, 2011

(65) Prior Publication Data
US 2012/0273731 A1    Nov. 1, 2012

Related U.S. Application Data

(60) Provisional application No. 61/255,145, filed on Oct. 27, 2009.

(51) Int. Cl.
*C08G 73/10* (2006.01)
*C08G 73/12* (2006.01)
*C08L 79/08* (2006.01)

(52) U.S. Cl.
USPC ............ 525/432; 525/420; 525/435; 525/436

(58) Field of Classification Search
USPC .................. 525/420, 436, 435, 432
IPC ....................... C08G 73/10, 73/12; C08L 79/08
See application file for complete search history.

(56) References Cited

U.S. PATENT DOCUMENTS

| 4,107,125 | A * | 8/1978 | Lovejoy | 523/307 |
| 5,055,116 | A * | 10/1991 | Kohn et al. | 95/47 |
| 5,116,939 | A * | 5/1992 | Fletcher et al. | 528/353 |
| 7,265,181 | B2 * | 9/2007 | Lin et al. | 525/183 |
| 2008/0119616 | A1* | 5/2008 | Donovan et al. | 525/432 |
| 2009/0258211 | A1* | 10/2009 | Yoshinaga et al. | 428/220 |
| 2010/0233488 | A1* | 9/2010 | Sonobe | 428/421 |

* cited by examiner

Primary Examiner — Ling Choi
Assistant Examiner — Brieann R Fink

(57) ABSTRACT

Polyimide resin compositions that contain an end-capped rigid aromatic polyimide, graphite and, optionally, a filler selected from sepiolite, attapulgite, kaolinite, or a mixture thereof, are found to exhibit low wear at high temperatures. Such compositions are especially useful in molded articles that are exposed to wear conditions at high temperatures such as aircraft engine parts.

3 Claims, 2 Drawing Sheets

POLYIMIDE RESINS FOR HIGH TEMPERATURE WEAR APPLICATIONS

This application claims priority under 35 U.S.C. §119(e) from, and claims the benefit of, U.S. Provisional Application No. 61/255,145, filed Oct. 27, 2010, which is by this reference incorporated in its entirety as a part hereof for all purposes.

TECHNICAL FIELD

This disclosure relates to filled polyimide resin compositions that are useful for high temperature wear applications such as aircraft engine parts.

BACKGROUND

The unique performance of polyimide compositions under stress and at high temperatures have made them useful in applications requiring high wear resistance, particularly at conditions of high pressure and velocity. Some examples of such applications are aircraft engine parts, aircraft wear pads, automatic transmission bushings and seal rings, tenter frame pads and bushings, material processing equipment parts, and pump bushings and seals.

Typically, a polyimide component in applications as described above is intended to function as a sacrificial, or consumable, component, thereby preventing or reducing the wear or damage that a more costly mating or adjacent component would experience if it were mated against some other component. However, as the polyimide component wears, the resulting increased clearances can result in other adverse effects, such as increased leakage (of air pressure or fluid) or increased noise, thereby reducing the operating effectiveness of the entire system in which the polyimide component is contained. Restoring the system to its original operating effectiveness would require replacement of the worn polyimide component with a new un-used polyimide component. Replacement may require disassembly, reassembly, testing and re-calibration ("service") of the system, resulting in considerable costs in terms of down-time and labor. Thus, a polyimide component that demonstrates a lower rate of wear is desirable to reduce the frequency of replacement and service, thereby reducing cost.

Improvement in thermooxidative stability ("TOS") as a consequence of end-capping has been found in polyimides containing flexible linkages [see, e.g., Meador et al., *Macromolecules*, 37 (2004), 1289-1296]. End-capping has actually been found to decrease TOS in certain rigid aromatic polyimide compositions, however. Despite the variety of polyimide compositions, and fillers for same, that have previously been available, and despite the previous work in the art, a need still remains for polyimide compositions that exhibit as molded parts the desirably high degree of wear resistance at the higher temperatures and increased pressure velocity load currently required for applications such aircraft engine parts, while maintaining the other advantageous attributes of the polyimide material.

SUMMARY

In one embodiment, this invention provides a wear resistant, rigid polyimide including a polymer chain that includes aromatic tetracarboxylic acid moieties, aromatic diamine moieties, and moieties obtained from phthalic anhydride, or a derivative thereof, as represented by the structure of the following Formula (IV):

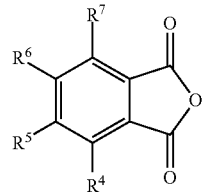

wherein $R^4$, $R^5$, $R^6$ and $R^7$ are each independently selected from H, Br, Cl, F, alkyl, alkoxy or fluoroalkyl.

In another embodiment, this invention provides a composition including in admixture (a) about 40 weight parts or more and yet about 92 weight parts or less of a polyimide as described above; (b) about 8 weight parts or more and yet about 60 weight parts or less of graphite; and (c) 0 weight parts or more and yet about 5.0 weight parts or less of a filler selected from one or more members of the group consisting of sepiolite, attapulgite and kaolinite.

In a further embodiment, this invention provides a method of preparing a wear resistant polyimide by (a) contacting in a solvent an aromatic tetracarboxylic acid compound, an aromatic diamine compound, and a phthalic anhydride, or derivative thereof, as represented by the structure of the following Formula (IV):

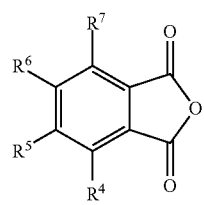

wherein $R^4$, $R^5$, $R^6$, and $R^7$ are each independently selected from H, Br, Cl, F, alkyl, alkoxy, or fluoroalkyl, to create a polyamic acid; and (b) imidizing the polyamic acid.

In yet another embodiment, this invention provides a method of preparing a wear resistant polyimide by (a) end-capping, with phthalic anhydride, or a derivative of phthalic anhydride, as represented by the structure of the following Formula (IV)

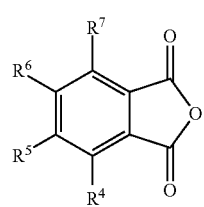

wherein $R^4$, $R^5$, $R^6$, and $R^7$ are each independently H, Br, Cl, F, alkyl, alkoxy, or fluoroalkyl, a rigid aromatic polyimide having a degree of polymerization ("DP") of less than about 50 to form an end-capped polyimide; and (b) admixing the end-capped polyimide with an uncapped, rigid aromatic polyimide having a DP of greater than about 60, in a ratio of about 1 part end-capped polyimide to about 3 to about 10 parts uncapped polyimide by weight.

In yet another embodiment, this invention provides a method for increasing the high-temperature wear resistance of a rigid aromatic polyimide, comprising end-capping the rigid aromatic polyimide with phthalic anhydride or a derivative of phthalic anhydride.

In yet another embodiment, this invention provides a composition that includes (a) about 40 weight parts or more and yet about 92 weight parts or less of an aromatic polyimide, wherein the polyimide is end-capped with phthalic anhydride or a derivative of phthalic anhydride, (b) about 8 weight parts or more and yet about 60 weight parts or less graphite, and (c) zero weight parts or more and yet about 5 weight parts or less of: sepiolite, attapulgite, kaolinite, or a mixture of two or more of these; where weight parts (a), (b), and (c) combined together total to 100 weight parts.

Articles fabricated from the above described compositions are also provided.

BRIEF DESCRIPTION OF THE DRAWINGS

Various features and/or embodiments of this invention are illustrated in drawings as described below. These features and/or embodiments are representative only, and the selection of these features and/or embodiments for inclusion in the drawings should not be interpreted as an indication that subject matter not included in the drawings is not suitable for practicing the invention, or that subject matter not included in the drawings is excluded from the scope of the appended claims and equivalents thereof.

DETAILED DESCRIPTION

Figure 1:
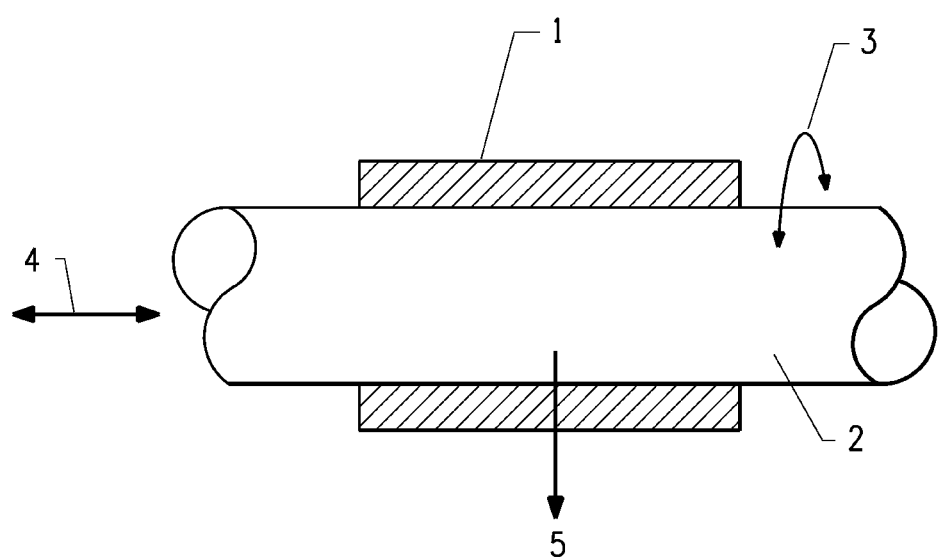
FIG. 1 is a schematic of an apparatus for measuring wear using a vibratory/oscillatory test method.

Disclosed herein is a wear resistant, rigid polyimide comprising a polymer chain that comprises aromatic tetracarboxylic acid moieties, aromatic diamine moieties, and moieties obtained from phthalic anhydride, or a derivative thereof, as represented by the structure of the following Formula (IV):

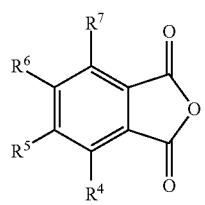

IV wherein $R^4$, $R^5$, $R^6$ and $R^7$ are each independently selected from H, Br, Cl, F, alkyl, alkoxy or fluoroalkyl.

Also disclosed herein is a composition comprising in admixture (a) about 40 weight parts or more and yet about 92 weight parts or less of a polyimide as described above; (b) about 8 weight parts or more and yet about 60 weight parts or less of graphite; and (c) 0 weight parts or more and yet about 5.0 weight parts or less of a filler selected from one or more members of the group consisting of sepiolite, attapulgite and kaolinite.

Also disclosed herein are compositions that contain (a) a rigid aromatic polyimide, wherein the rigid aromatic polyimide is end-capped with phthalic anhydride or a derivative of phthalic anhydride, (b) graphite, and, optionally, (c) sepiolite, attapulgite, kaolinite, or a mixture of two or more of these.

A polyimide as disclosed in this invention, or as used as the component "(a)" in a composition hereof, is polymer in which at least about 80%, preferably at least about 90%, and more preferably essentially all (e.g. at least about 98%) of the linking groups between repeat units are imide groups. An aromatic polyimide as used herein includes an organic polymer in which about 60 to about 100 mol %, preferably about 70 mol % or more, and more preferably about 80 mol % or more of the repeating units of the polymer chain thereof have a structure as represented by the following Formula (I):

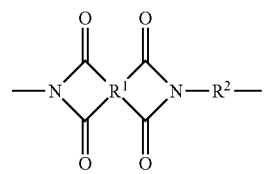

wherein $R^1$ is a tetravalent aromatic radical and $R^2$ is a divalent aromatic radical, as described below.

An aromatic polyimide as used herein is a rigid aromatic polyimide. A polyimide polymer is considered rigid when there are no, or an insignificant amount (e.g. less than about 10 mol %, less than about 5 mol %, less than about 1 mol % or less than about 0.5 mol %) of, flexible linkages in the polyimide repeating unit. Flexible linkages are moieties that are predominantly composed of a small number of atoms, and that have an uncomplicated structure (such as straight-chain rather than branched or cyclic), and thus permit the polymer chain to bend or twist with relative ease at the location of the linkage Examples of flexible linkages include without limitation: —O—, —N(H)—C(O)—, —S—, —SO$_2$—, —C(O)—, —C(O)—O—, —C(CH$_3$)$_2$—, —C(CF$_3$)$_2$—, —(CH$_2$)—, and —NH(CH$_3$)—.

A polyimide polymer suitable for use herein may be synthesized, for example, by reacting a monomeric aromatic diamine compound (which includes derivatives thereof) with a monomeric aromatic tetracarboxylic acid compound (which includes derivatives thereof), and the tetracarboxylic acid compound can thus be the tetracarboxylic acid itself, the corresponding dianhydride, or a derivative of the tetracarboxylic acid such as a diester diacid or a diester diacidchloride. The reaction of the aromatic diamine compound with an aromatic tetracarboxylic acid compound produces the corresponding polyamic acid ("PAA"), amic ester, amic acid ester, or other reaction product according to the selection of starting materials. An aromatic diamine is typically polymerized with a dianhydride in preference to a tetracarboxylic acid, and in such a reaction a catalyst is frequently used in addition to a solvent. A nitrogen-containing base, phenol or an amphoteric material can be used as such a catalyst.

A polyamic acid, as a precursor to a polyimide, can be obtained by polymerizing an aromatic diamine compound and an aromatic tetracarboxylic acid compound, preferably in substantially equimolar amounts, in an organic polar solvent that is generally a high-boiling solvent such as pyridine, N-methylpyrrolidone, dimethylacetamide, dimethylformamide or mixtures thereof. The amount of all monomers in the solvent can be in the range of about 5 to about 40 wt %, in the range of about 6 to about 35 wt %, or in the range of about 8 to about 30 wt %, based on the combined weight or monomers and solvent. The temperature for the reaction is generally not higher than about 100° C., and may be in the range of about 10° C. to 80° C. The time for the polymerization reaction generally is in the range of about 0.2 to 60 hours.

Imidization to produce the polyimide, i.e. ring closure in the polyamic acid, can then be effected through thermal treatment (as described, for example, in U.S. Pat. No. 5,886,129, which is by this reference incorporated as a part hereof for all purposes), chemical dehydration or both, followed by the elimination of a condensate (typically, water or alcohol). For example, ring closure can be effected by a cyclization agent such as pyridine and acetic anhydride, picoline and acetic anhydride, 2,6-lutidine and acetic anhydride, or the like.

In various embodiments of the thus-obtained polyimide, about 60 to 100 mole percent, preferably about 70 mole percent or more, more preferably about 80 mole percent or more, of the moieties (i.e. repeating units in the polymer chain derived from monomeric compounds) of the polymer chain thereof have a polyimide structure as represented by the following Formula (I):

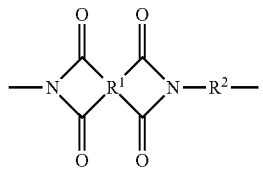

I wherein $R^1$ is a tetravalent aromatic radical derived from the tetracarboxylic acid compound; and $R^2$ is a divalent aromatic radical derived from the diamine compound, which may typically be represented as $H_2N-R^2-NH_2$.

A diamine compound as used to prepare a polyimide for a composition hereof, and thus from which the moieties (or repeating units in the polymer chain derived from monomeric compounds) of the polymer are derived, may be one or more of the aromatic diamines that can be represented by the structure $H_2N-R^2-NH_2$, wherein $R^2$ is a divalent aromatic radical containing up to 16 carbon atoms and, optionally, containing one or more (but typically only one) heteroatoms in the aromatic ring, a heteroatom being, for example, selected from $-N-$, $-O-$, or $-S-$. Also included herein are those $R^2$ groups wherein $R^2$ is a biphenylene group. Examples of aromatic diamines suitable for use to make a polyimide for a composition hereof include without limitation 2,6-diaminopyridine, 3,5-diaminopyridine, 1,2-diaminobenzene, 1,3-diaminobenzene (also known as m-phenylenediamine or "MPD"), 1,4-diaminobenzene (also known as p-phenylenediamine or "PPD"), 2,6-diaminotoluene, 2,4-diaminotoluene, naphthalenediamines, and benzidines such as benzidine and 3,3'-dimethylbenzidine. The aromatic diamines can be employed singly or in combination. In one embodiment, the aromatic diamine compound is 1,4-diaminobenzene (also known as p-phenylenediamine or "PPD"), 1,3-diaminobenzene (also known as m-phenylenediamine or "MPD"), or mixtures thereof.

Aromatic tetracarboxylic acid compounds suitable for use to prepare a polyimide for a composition hereof, and thus from which the moieties (or repeating units in the polymer chain derived from monomeric compounds) of the polymer are derived, may include without limitation aromatic tetracarboxylic acids, acid anhydrides thereof, salts thereof and esters thereof. An aromatic tetracarboxylic acid compound may be as represented by the structure of the following Formula (II):

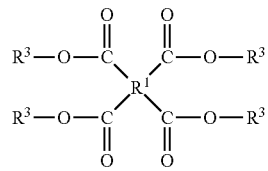

II wherein $R^1$ is a tetravalent aromatic group and each $R^3$ is independently hydrogen or a lower alkyl (e.g. a normal or branched $C_1 \sim C_{10}$, $C_1 \sim C_8$, $C_1 \sim C_6$ or $C_1 \sim C_4$) group. In various embodiments, the alkyl group is a $C_1$ to $C_3$ alkyl group. In various embodiments, the tetravalent organic group $R^1$ may have a structure as represented by one of the following formulae:

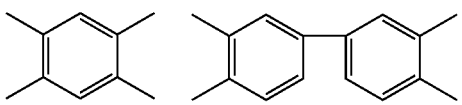

Examples of suitable aromatic tetracarboxylic acids include without limitation 3,3',4,4'-biphenyltetracarboxylic acid, 2,3,3',4'-biphenyltetracarboxylic acid, pyromellitic acid, 2,3,6,7-naphthalenetetracarboxylic acid, and 3,3',4,4'-benzophenonetetracarboxylic acid. The aromatic tetracarboxylic acids can be employed singly or in combination. In one embodiment, the aromatic tetracarboxylic acid compound is an aromatic tetracarboxylic dianhydride. Examples include without limitation 3,3',4,4'-biphenyltetracarboxylic dianhydride ("BPDA"), pyromellitic dianhydride ("PMDA"), 3,3,4,4'-benzophenonetetracarboxylic dianhydride, 1,4,5,8-naphthalenetetracarboxylic dianhydride, 2,3,6,7-naphthalenetetracarboxylic dianhydride, 1,4,5,8-naphthalenetetracarboxylic acid, 2,3,6,7-naphthalenetetracarboxylic acid, and mixtures thereof.

In one embodiment of a composition hereof, a suitable polyimide polymer may be prepared from 3,3',4,4'-biphenyltetracarboxylic dianhydride ("BPDA") as the aromatic tetracarboxylic acid compound, and from a mixture of p-phenylenediamine ("PPD") and m-phenylenediamine ("MPD") as the aromatic diamine compound. In one embodiment, the aromatic diamine compound is greater than 60 to about 85 mol % p-phenylenediamine and 15 to less than 40 mol % m-phenylenediamine. Such a polyimide is described in U.S. Pat. No. 5,886,129, and the moieties, or repeating units, of such a polyimide may also be represented by the structure of the following Formula (III):

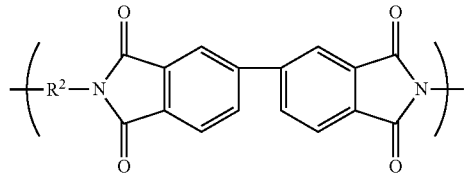

III wherein greater than 60 to about 85 mol % of the $R^2$ groups are p-phenylene radicals:

and 15 to less than 40 mol % are m-phenylene radicals:

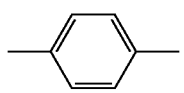

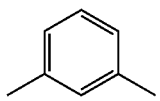

In an alternative embodiment, a suitable polyimide polymer may be prepared from 3,3',4,4'-biphenyltetracarboxylic dianhydride ("BPDA") as a dianhydride derivative of the tetracarboxylic acid compound, and 70 mol % p-phenylenediamine and 30 mol % m-phenylenediamine as the diamine compound.

A polyimide as used herein is preferably an infusible polymer, which is a polymer that does not melt (i.e. liquefy or flow) below the temperature at which it decomposes. Typically, parts prepared from a composition of an infusible polyimide are formed under heat and pressure, much like powdered metals are formed into parts (as described, for example, in U.S. Pat. No. 4,360,626, which is by this reference incorporated as a part hereof for all purposes).

A polyimide as used herein preferably has a high degree of stability to thermal oxidation. At elevated temperature, the polymer will thus typically not undergo combustion through reaction with an oxidant such as air, but will instead vaporize in a thermolysis reaction.

A rigid aromatic polyimide as used herein is end-capped with phthalic anhydride or a derivative of phthalic anhydride, as represented by the structure of the following Formula (IV):

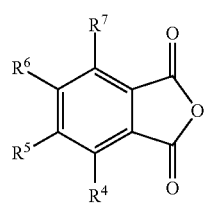

IV wherein $R^4$, $R^5$, $R^6$, and $R^7$ are each independently H, Br, Cl, F, alkyl, alkoxy, or fluoroalkyl. In one embodiment, $R^4$, $R^5$, $R^6$, and $R^7$ are each H (phthalic anhydride). In another embodiment, $R^4$, $R^5$, $R^6$, and $R^7$ are each Br (tetrabromophthalic anhydride).

The end-capping reaction is carried out by any convenient method such as by adding the end-capping agent [i.e., phthalic anhydride or a derivative of phthalic anhydride, as represented by the structure of Formula (IV)] in a molar ratio of end-capping agent to aromatic tetracarboxylic acid compound of about 0.005 or more, about 0.0065 or more, about 0.008 or more, and yet about 0.03 or less, about 0.025 or less, or about 0.02 or less.

The end-capping agent (i.e., phthalic anhydride or a derivative of phthalic anhydride) may be added at any of various stages of preparation of the polyimide. For example, Srinivas et al [*Macromolecules*, 30 (1997), 1012-1022] in preparing a polyimide from BPDA and 1,3-bis(4-aminophenoxy)benzene reported adding the end-capping agent to a solution of the diamine, then adding dianhydride and allowing reaction to proceed for 24 hours at 25° C., thereby producing an end-capped polyamic acid which was subsequently imidized.

Alternatively, and as generally described in Example 1 below, the end-capping agent and aromatic tetracarboxylic acid compound (e.g. a dianhydride) may be added together to a heated diamine solution (e.g. about 70° C.) and allowed to react for about 2 hours thereby producing an end-capped polyamic acid which is subsequently imidized.

End-capping a polyimide itself has also been reported, for example in JP 2004-123,857A, in which 4-chlorophthalic anhydride was added to a polyimide after imidization was complete. Use of an end-capping agent to cap, or stop the polymeric growth of, a polyimide hereof, produces an end-capped polyimide. Correspondingly, a polyimide into which an end-capping agent has not been incorporated is an uncapped polyimide.

An end-capped polyimide of this invention will desirably have a degree of polymerization ("DP") of about 60 or greater, or in some embodiments about 80 or greater, or in some embodiments in the range of about 60 to about 150, or in some embodiments in the range of about 80 to about 120. The DP should not be so high as to raise the viscosity of the polyamic acid to a level at which it is unprocessible. Degree of polymerization is calculated according to the Carothers Equation, which is discussed in sources such as: Carothers, Wallace (1936) "Polymers and Polyfunctionality", *Transaction of the Faraday Society* 32: 39-49; Cowie, J. M. G. "Polymers: Chemistry & Physics of Modern Materials" (2nd edition, Blackie 1991) p. 29; and Allcock, Lampe and Mark, "Contemporary Polymer Chemistry" (3rd ed., Pearson 2003) p. 324.

One method of preparing a wear resistant polyimide involves (a) contacting in a solvent an aromatic tetracarboxylic acid compound, an aromatic diamine compound, and a phthalic anhydride, or derivative thereof, as represented by the structure of the following Formula (IV):

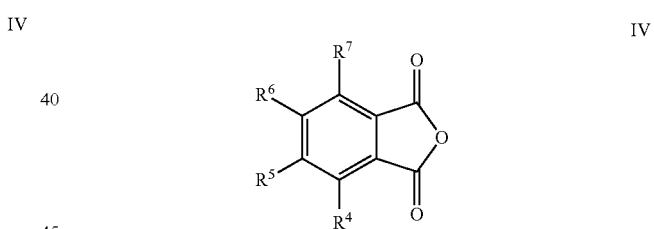

IV wherein $R^4$, $R^5$, $R^6$, and $R^7$ are each independently selected from H, Br, Cl, F, alkyl, alkoxy, or fluoroalkyl, to create a polyamic acid; and (b) imidizing the polyamic acid. In this method, graphite may also be admixed with the polyamic acid before the imidization of step (b).

Another method of preparing a wear resistant polyimide involves (a) end-capping, with phthalic anhydride, or a derivative of phthalic anhydride, as represented by the structure of the following Formula (IV)

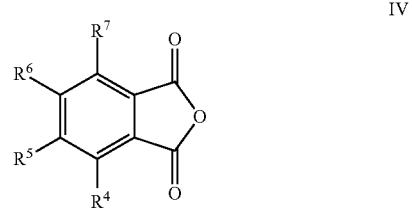

IV wherein $R^4$, $R^5$, $R^6$, and $R^7$ are each independently H, Br, Cl, F, alkyl, alkoxy, or fluoroalkyl, a rigid aromatic polyimide having a degree of polymerization ("DP") of less than about 50 to form an end-capped polyimide; and (b) admixing the end-capped polyimide with an uncapped, rigid aromatic polyimide having a DP of greater than about 60, in a ratio of about 1 part end-capped polyimide to about 3 to about 10 parts uncapped polyimide by weight. In this method, the ratio of end-capped polyimide to uncapped polyimide may further be at least about 1/10, or at least about 1/6, or at least about 1/5, and yet less than about 1/3, or less than about 1/5, or less than about 1/6.

The wear resistant polyimide may then be fabricated into a part by applying heat and pressure, as described, for example, in U.S. Pat. No. 4,360,626, op. cit.

Graphite is used as the component "(b)" of a composition hereof. Graphite is typically added to a polyimide composition to improve wear and frictional characteristics, and to control the coefficient of thermal expansion (CTE). The amount of graphite used in a polyimide composition for such purpose is thus sometimes advantageously chosen to match the CTE of the mating components.

Graphite is commercially available in a variety of forms as a fine powder, and may have a widely varying average particle size that is, however, frequently in the range of from about 5 to about 75 microns. In one embodiment, the average particle size is in the range of from about 5 to about 25 microns. In another embodiment, graphite as used herein contains less than about 0.15 weight percent of reactive impurities, such as those selected from the group consisting of ferric sulfide, barium sulfide, calcium sulfide, copper sulfide, barium oxide, calcium oxide, and copper oxide.

Graphite as suitable for use herein can be either naturally occurring graphite or synthetic graphite. Natural graphite generally has a wide range of impurity concentrations, while synthetically produced graphite is commercially available having low concentrations of reactive impurities. Graphite containing an unacceptably high concentration of impurities can be purified by any of a variety of known treatments including, for example, chemical treatment with a mineral acid. Treatment of impure graphite with sulfuric, nitric or hydrochloric acid, for example, at elevated or reflux temperatures can be used to reduce impurities to a desired level.

A composition as described herein may further include nanoparticles of: sepiolite, attapulgite, kaolinite, or a mixture of two or more of these, as component (c). As used herein, the term "nanoparticles" refers to particles having at least one dimension in the 0.1 to 100 nm range. The presence of agglomerates of nanoparticles should be minimized or avoided.

Sepiolite [$Mg_4Si_6O_{15}(OH)_2 \cdot 6(H_2O)$] is a hydrated magnesium silicate filler that exhibits a high aspect ratio due to its fibrous structure. It is composed of long lath-like crystallites in which the silica chains run parallel to the axis of the fiber. Attapulgite (also known as palygorskite), is almost structurally and chemically identical to sepiolite except that attapulgite has a slightly smaller unit cell.

Sepiolite and attapulgite are clays that are layered fibrous materials in which each layer is made up of two sheets of tetrahedral silica units bonded to a central sheet of octahedral units containing magnesium ions. The fibers stick together to form fiber bundles, which in turn can form agglomerates. These agglomerates can be broken apart by industrial processes such as micronization or chemical modification (see, e.g., European Patent 170,299 to Tolsa S. A.).

In one embodiment, the sepiolite is a rheological grade sepiolite clay, such as that which is described in EP-A-454,222 and/or EP-A-170,299 and marketed under the Pangel® trademark by Tolsa S. A., Madrid, Spain. The term "rheological grade" in this context refers to a sepiolite clay typically having an average surface area greater than 120 $m^2/g$ [as measured in $N_2$ by the Brunauer/Emmett/Teller method (as described in Brunauer et al, "Adsorption of Gases in Multimolecular Layers", *Journal of the American Chemical Society*, 60: 309-19, 1938)], and typically having average fiber dimensions of about 200 to 2000 nm long, 10-30 nm wide, and 5-10 nm thick. Rheological grade sepiolite is obtained from natural sepiolite by means of micronization processes that substantially prevent breakage of the sepiolite fibers, such that the sepiolite disperses easily in water and other polar liquids, and has an external surface with a high degree of irregularity, a high specific surface, greater than 300 $m^2/g$ and a high density of active centers for adsorption, that provide it a very high water retaining capacity upon being capable of forming, with relative ease, hydrogen bridges with the active centers.

The above-mentioned qualities of rheological grade sepiolite can also be found in rheological grade attapulgite, which typically has a particle size smaller than 40 microns, such as the range of ATTAGEL® clays (for example ATTAGEL 40 and ATTAGEL 50) manufactured and marketed by Engelhard Corporation, United States; and the MIN-U-GEL range of products from Floridin Company.

Kaolinite is a sheet-type silicate whose molecules are arranged in two sheets or plates, one of silica and one of alumina. Kaolinite is a clay mineral with the chemical composition $Al_2Si_2O_5(OH)_4$. It is a layered silicate mineral, with one tetrahedral sheet linked through oxygen atoms to one octahedral sheet of alumina octahedra. Rocks that are rich in kaolinite are known as china clay or kaolin. In contrast, smectites such as montmorillonite clay minerals are arranged in two silica sheets and one alumina sheet. The molecules of the smectites are less firmly linked together than those of the kaolinite group and are thus further apart. Maintaining the phase stability of crystal structure of the sheet silicates is desirable, as is maintaining the thermal stability of the structural water of the sheet silicates at higher temperatures, such as up to about 450° C. [as shown, for example, by thermogravimetric analysis (TGA)]. Loss of structural water during processing of a polyimide composition can result in harm to polyimide integrity, and possibly change the crystal structure of the sheet silicate, giving a harder, more abrasive compound. Examples of sheet silicates that are not stable enough to be included in the compositions described herein are montmorillonite, vermiculite, and pyrophyllite.

Kaolinite is available commercially in a variety of grades and particle sizes. Polyfil® Kaolinite, from Huber Engineered Materials (Atlanta, Ga., USA), part of J.M. Huber Corporation (Edison, N.J., USA), is a particularly suitable kaolinite for the compositions disclosed herein. It is particularly clean, having been subjected to a water wash that results in 0.005% or less 325-mesh sieve residue remaining. Median particle sizes range from 0.2 μm to 4 μm.

Sepiolites, attapulgites and kaolinites suitable for use herein are discussed further in Murray, *Applied Clay Science* 17 (2000) 207-221.

The graphite and, if present, component (c), as used in the compositions and articles hereof are frequently incorporated into the heated solvent prior to transfer of the PAA polymer solution (or other solution for other types of monomers) as described above, so that the resulting polyimide is precipitated in the presence of the components (b) and (c), which thereby become incorporated into the composition.

In the compositions of this invention, the content of the various components includes all of the possible ranges that may be formed from the following amounts:

component (a), a rigid aromatic polyimide, end-capped with phthalic anhydride or a derivative of phthalic anhydride, may be present in an amount of about 40 weight parts or more, about 42 weight parts or more, about 44 weight parts or more, or about 46 weight parts or more, and yet in an amount of about 92 weight parts or less, or about 85 weight parts or less, or about 70 weight parts or less, or about 55 weight parts or less, or about 50 weight parts or less;

component (b), a graphite, may be present in an amount of about 8 weight parts or more, or about 15 weight parts or more, or about 30 weight parts or more, or about 50 weight parts or more, or about 52 weight parts or more, and yet in an amount of about 60 weight parts or less, or about 58 weight parts or less, or about 56 weight parts or less, or about 54 weight parts or less; and component (c), sepiolite, attapulgite, kaolinite, or a mixture of two or more of these, when present, may be present in an amount of about 0.5 weight parts or more, or about 0.75 weight parts or more, or about 1.0 weight parts or more, or about 1.25 weight parts or more, or about 1.5 weight parts or more, and yet in an amount of about 5.0 weight parts or less, or about 4 weight parts or less, or about 3 weight parts or less, or about 2 weight parts or less, or about 1.75 weight parts or less.

In a composition hereof, the amounts of the respective weight parts of the three components as combined together in any particular formulation, taken from the ranges as set forth above, may but need not total to 100 weight parts.

The compositions of this invention include all of the formulations in which the compositional content may be expressed by any combination of the various maxima and minima, as set forth above, for any one component of the composition together with any such combination of maxima and minima for either or both of the other two components.

One or more additives may be used as an optional component "(d)" of a composition hereof. When used, additive(s) may be used in an amount in the range of about 5 wt % to about 70 wt % based on the total weight of all four components together in a 4-component [(a)+(b)+(c)+(d)] composition, with the total weight of three components together in a 3-component [(a)+(b)+(c)] composition being in the range of about 30 wt % to about 95 wt % based on the total weight of all four components together in a 4-component [(a)+(b)+(c)+(d)] composition.

Additives suitable for optional use in a composition hereof may include, without limitation, one or more of the following: pigments; antioxidants; materials to impart a lowered coefficient of thermal expansion, e.g. carbon fibers; materials to impart high strength properties e.g. glass fibers, ceramic fibers, boron fibers, glass beads, whiskers, graphite whiskers or diamond powders; materials to impart heat dissipation or heat resistance properties, e.g. aramid fibers, metal fibers, ceramic fibers, whiskers, silica, silicon carbide, silicon oxide, alumina, magnesium powder or titanium powder; materials to impart corona resistance, e.g. natural mica, synthetic mica or alumina; materials to impart electric conductivity, e.g. carbon black, silver powder, copper powder, aluminum powder or nickel powder; materials to further reduce wear or coefficient of friction, e.g. boron nitride or poly(tetrafluoroethylene) homopolymer and copolymers. Fillers may be added as dry powders to the final resin prior to parts fabrication.

Materials suitable for use in or to make a composition hereof may themselves be made by processes known in the art, or are available commercially from suppliers such as Alfa Aesar (Ward Hill, Mass.), City Chemical (West Haven, Conn.), Fisher Scientific (Fairlawn, N.J.), Sigma-Aldrich (St. Louis, Mo.) or Stanford Materials (Aliso Viejo, Calif.).

As with products made from other infusible polymeric materials, parts fabricated from a composition hereof may be made by techniques involving the application of heat and pressure (see, for example, U.S. Pat. No. 4,360,626). Suitable conditions may include, for example, pressures in the range of from about 50,000 to 100,000 psi (345 to 690 MPa) at ambient temperatures. Physical properties of articles molded from a composition hereof can be further improved by sintering, which may typically be performed at a temperature in the range of from about 300° C. to about 450° C.

Parts and other articles prepared from a composition hereof exhibit improved wear properties over comparable compositions comprising polyimide that is not end-capped and are useful in, for example, aerospace, transportation, and materials handling and processing equipment applications. These parts include a bushing, seal ring, spring, valve seat, vane, washer, button, roller, clamp, washer, gasket, spline, wear strip, bumper, slide block, spool, poppet, valve plate, labyrinth seal or thrust plug.

Parts and other articles prepared from a composition hereof are useful in aerospace applications such as aircraft engine parts, such as bushings (e.g., variable stator vane bushings), bearings, washers (e.g., thrust washers), seal rings, gaskets, wear pads, splines, wear strips, bumpers, and slide blocks. These aerospace application parts may be used in all types of aircraft engines such as reciprocating piston engines and, particularly, jet engines. Other examples of aerospace applications include without limitation: turbochargers; shrouds, aircraft subsystems such as thrust reversers, nacelles, flaps systems and valves, and aircraft fasteners; airplane spline couplings used to drive generators, hydraulic pumps, and other equipment; tube clamps for an aircraft engine to attach hydraulic, hot air, and/or electrical lines on the engine housing; control linkage components, door mechanisms, and rocket and satellite components.

Parts and other articles prepared from a composition hereof are also useful in transportation applications, for example, as components in vehicles such as but not limited to automobiles, recreational vehicles, off-road vehicles, military vehicles, commercial vehicles, farm and construction equipment and trucks. Examples of vehicular components include without limitation: automotive and other types of internal combustion engines; other vehicular subsystems such as exhaust gas recycle systems and clutch systems; fuel systems (e.g., bushings, seal rings, band springs, valve seats); pumps (e.g., vacuum pump vanes); transmission components (e.g., thrust washers, valve seats, and seal rings such as seal rings in a continuously variable transmission), transaxle components, drive-train components, non-aircraft jet engines; engine belt tensioners; rubbing blocks in ignition distributors; powertrain applications (e.g., emission components, variable valve systems, turbochargers (e.g., ball bearing retainers, wastegate bushings), air induction modules); driveline applications (e.g., seal rings, thrust washers and fork pads in manual and dual clutch transmissions, transfer cases); seal rings and thrust washers for heavy-duty off-road transmissions and hydraulic motors; bushings, buttons, and rollers for continuous variable transmissions in all-terrain vehicles ("ATVs") and snowmobiles; and chain tensioners for snowmobile gear cases; brake systems (e.g., wear pads, valve components for anti-lock braking systems); door hinge bushings; gear stick rollers; wheel disc nuts, steering systems, air conditioning systems; suspension systems; intake and exhaust systems; piston rings; and shock absorbers.

Parts and other articles prepared from a composition hereof are also useful in material handling equipment and materials processing equipment, such as injection molding machines and extrusion equipment (e.g., insulators, seals, bushings and bearings for plastic injection molding and extrusion equipment), conveyors, belt presses and tenter frames; and films, seals, washers, bearings, bushings, gaskets, wear pads, seal rings, slide blocks and push pins, glass handling parts such as clamps and pads, seals in aluminum casting machines, valves (e.g., valve seats, spools), gas compressors (e.g., piston rings, poppets, valve plates, labyrinth seals), hydraulic turbines, metering devices, electric motors (e.g., bushings, washers, thrust plugs), small-motor bushings and bearings for hand-held tools appliance motors and fans, torch insulators, and other applications where low wear is desirable.

Parts and other articles prepared from a composition hereof are also useful in the manufacture of beverage cans, for example, bushings in body makers that form the can shape, vacuum manifold parts, and shell press bands and plugs; in the steel and aluminum rolling mill industry as bushings and mandrel liners; in gas and oil exploration and refining equipment; and in textile machinery (e.g., bushings for weaving machines, ball cups for knitting looms, wear strips for textile finishing machines).

In some applications, a part or other article prepared from a composition hereof is in contact with metal at least part of the time when the apparatus in which it resides is assembled and in normal use.

EXAMPLES

The advantageous attributes and effects of the compositions hereof may be seen in a series of examples (Examples 1~6), as described below. The embodiments of these compositions on which the examples are based are representative only, and the selection of those embodiments to illustrate the invention does not indicate that materials, components, reactants, ingredients, formulations or specifications not described in these examples are not suitable for practicing the inventions herein, or that subject matter not described in these examples is excluded from the scope of the appended claims and equivalents thereof.

In the examples, the following abbreviations are used: "BPDA" is defined as 3,3',4,4'-biphenyltetracarboxylic anhydride, "cm" is defined as centimeter(s), "DP" is defined as degree of polymerization, "g" is defined as gram(s), "in" is defined as inch, "mL" is defined as milliliter(s), "mm" is defined as millimeter(s), "mmol" is defined as millimole(s), "MPa" is defined as megapascal(s), "MPD" is defined as m-phenylenediamine, "MW" is defined as molecular weight, "PI" is defined as polyimide, "PPD" is defined as p-phenylenediamine, "psi" is defined as pounds per square inch, "RPM" is defined as revolutions per minute, "tBPA" is defined as tetrabromophthalic anhydride, "TOS" is defined as thermal oxidative stability, and "wt %" is defined as weight percent(age).

Materials.

3,3',4,4'-biphenyltetracarboxylic anhydride was obtained from Mitsubishi Gas Chemical Co., Inc. (Tokyo, Japan). M-phenylenediamine and p-phenylenediamine were obtained from DuPont (Wilmington, Del., USA). The graphite used was a synthetic graphite, maximum 0.05% ash, with a median particle size of about 8 micrometers. Phthalic anhydride (at least 99% purity) and tetrabromophthalic anhydride (98% purity) were obtained from Sigma-Aldrich (St. Louis, Mo., USA). Polyfil® DL Kaolinite, which has a median particle size of 1 μm, was obtained from Huber Engineered Materials (Atlanta, Ga., USA), part of J.M. Huber Corporation (Edison, N.J., USA).

Methods.

Dried polyimide resin was fabricated into tensile bars for TOS measurements by direct forming according to ASTM E8 (2006), "Standard Tension Test Specimen for Powdered Metal Products-Flat Unmachined Tensile Test Bar", at room temperature and 100,000 psi (690 MPa) forming pressure. The tensile bars were sintered at 405° C. for 3 hours with a nitrogen purge.

Dried polyimide resin was fabricated into disk-shaped wear test specimens, where the disks were 2.5 cm in diameter and about 0.5 cm thick, by direct forming, using a procedure substantially according to the procedure described in U.S. Pat. No. 4,360,626 (especially column 2, lines 54-60).

In Test Method A, high temperature wear on the disks was measured using the test procedures described in ASTM G 133-05 (2005), "Standard Test Method for Linearly Reciprocating Ball-on-Flat Sliding Wear", modified by using a temperature controlled oven, with acquisition of friction force data on a computer. In these tests, a steel ball bearing was rubbed against the surface of a test specimen at the designated temperature under a 2 pound load oscillating at 300 cycles/minute for a 3 hour period. At the end of the experiment, the volume of the resulting wear scar on the test specimen was measured by optical profilometry, from which the volume of the wear scar was determined. The volume of the wear scar is reported as wear rate under the indicated test conditions.

In Test Method B, relative wear was also determined using a vibratory/oscillatory test method. Referring to FIG. 1, this test method utilizes two specimens: a cylindrical bushing specimen 1 (shown in section) and an aircraft engine (turbine type) vane specimen wherein the shaft 2 on the vane rotates in an oscillating manner 3 inside the bushing as the shaft of the vane is concurrently rapidly moved (i.e., vibrated) in an axial manner 4 as depicted in FIG. 1. The specimens move relative to one another in oscillatory rotational 3 and axial 4 movements under a prescribed set of conditions. The load 5 is applied vertically downward through the vane specimen against a horizontally mounted bushing specimen. The radial load, motion stroke length and frequency, test temperature, and test duration are selected such that the test best approximates the load/wear cycle that a bushing would see in an actual jet/turbine engine. Results are reported in terms of wall wear.

When testing particular vane/bushing combinations, aircraft engine builders regard the following as important properties: the hardness and surface finish of the vane, cyclic frequency and magnitude of oscillational and rotational movement, load on the vane shaft, vane diameter, vane material, vane hardness, bushing configuration, clearances between the bushing and vane specimens (i.e., tolerancing), and test temperature and method of applying heat (e.g., forced hot air into a test chamber or radiant electric heat, or a combination of these).

In Test Method C, relative wear life of specimens was determined using an isothermal aging test, as described in U.S. Patent Application 2010/0,043,522 (which is by this reference incorporated in its entirety as a part hereof for all purposes), which entails:

a) providing at least two sets of polymeric specimens, wherein the parts within each set are all made of same composition and in same manner, and each set is made of a different composition and/or made in a different manner;

b) determining wear rate as a function of aging time for each set, by:
   i) reserving at least one specimen as an unaged control;
   ii) aging each remaining specimen by heating it under a specified atmosphere and at a specified temperature for a specified aging time;
   iii) measuring the wear rate of the unaged and aged specimens over time as described above; and c) comparing the relative wear life determined in step (b) (iii) for each set of specimens.

Example 1

Preparation of a Polyimide Resin with 1% Tetrabromophthalate, Containing 50 weight % Graphite Polyimide resin based on 3,3',4,4'-biphenyltetracarboxylic dianhydride (BPDA), m-phenylene diamine (MPD) and p-phenylene diamine (PPD) was prepared according to the method described in U.S. Pat. No. 5,886,129, which is by this reference incorporated in its entirety as a part hereof for all purposes. Ingredients were 8.79 g (81.3 mmol) MPD, 20.52 g (190 mmol) PPD, 79.55 g (270 mmol) BPDA, and 1.25 g (2.70 mmol) tetrabromophthalic anhydride (tBPA) as an end-capping agent. The mole ratio of tBPA to BPDA was 1:100. The BPDA and tBPA were added to a pyridine solution of the MPD and PPD. The polyamic acid solution produced was imidized in the presence of 44.6 g of graphite, to produce a resin containing 50 wt % graphite. The resulting polyimide resin was isolated, washed, and dried. After drying, the resin was ground through a 20 mesh screen using a Wiley mill to form a powder.

The dried polyimide resin was fabricated into test specimens, disks 2.5 cm in diameter and about 0.5 cm thick, as described above. The wear rate of the test specimens as determined by Test Method A is given in Table 1, reported as the wear scar volume in units of $10^{-8}$ in$^3$ ($10^{-7}$ cm$^3$).

Comparative Example A

Preparation of an Unmodified Polyimide Containing 50 Weight % Graphite

This resin was prepared by the method of Example 1, except that the tetrabromophthalic anhydride was not used in the preparation. The wear rate of the resulting resin, as determined by Test Method A, is given in Table 1 as wear scar volume. This determination is an average of five resin batches (i.e. five disks were tested, each of which was from a different resin batch). The standard deviation is about 15%, as shown in Table 1, providing an indication of the statistical significance of the findings.

TABLE 1

| Sample | End-capping | Wear Rate at 800° F. (427° C.), $10^{-8}$ in$^3$ ($10^{-7}$ cm$^3$) |
|---|---|---|
| Example 1 | tBPA end-capped | 1845 (3023) |
| Comparative Example A | Not end-capped | 2354 ± 358 (3858 ± 587) |

Example 2

Isothermal Aging and Thermooxidative Stability of Filled and End-Capped Polyimide Resins Thermooxidative stability (TOS) was measured according to Test Method C under 5 atmospheres of air (0.5 MPa) on (i) samples of the control composition (Comparative Example A), and (ii) samples of the control composition to which there was added 1 mol phthalic anhydride per 100 moles BPDA (Sample 3A) as an end-capping agent. Weight loss after 25 hours at 800° F. (427° C.) was 6.02+/−0.44% for Sample 3A, and 2.87+/−0.50% for the control (Comp. Ex. A). The end-capping lessened thermooxidative stability.

Isothermal aging tests were also performed at 900° F. (482° C.) according to Test Method C on
(i) samples of two different batches of the control composition (Comparative Examples A1 and A2);
(ii) Sample 3A (the control composition to which there was added 1 mol phthalic anhydride per 100 moles BPDA); and
(iii) Sample 3B (the control composition to which there was added 1 mol phthalic anhydride per 100 moles BPDA and 1 wt % kaolinite).

Figure 2:
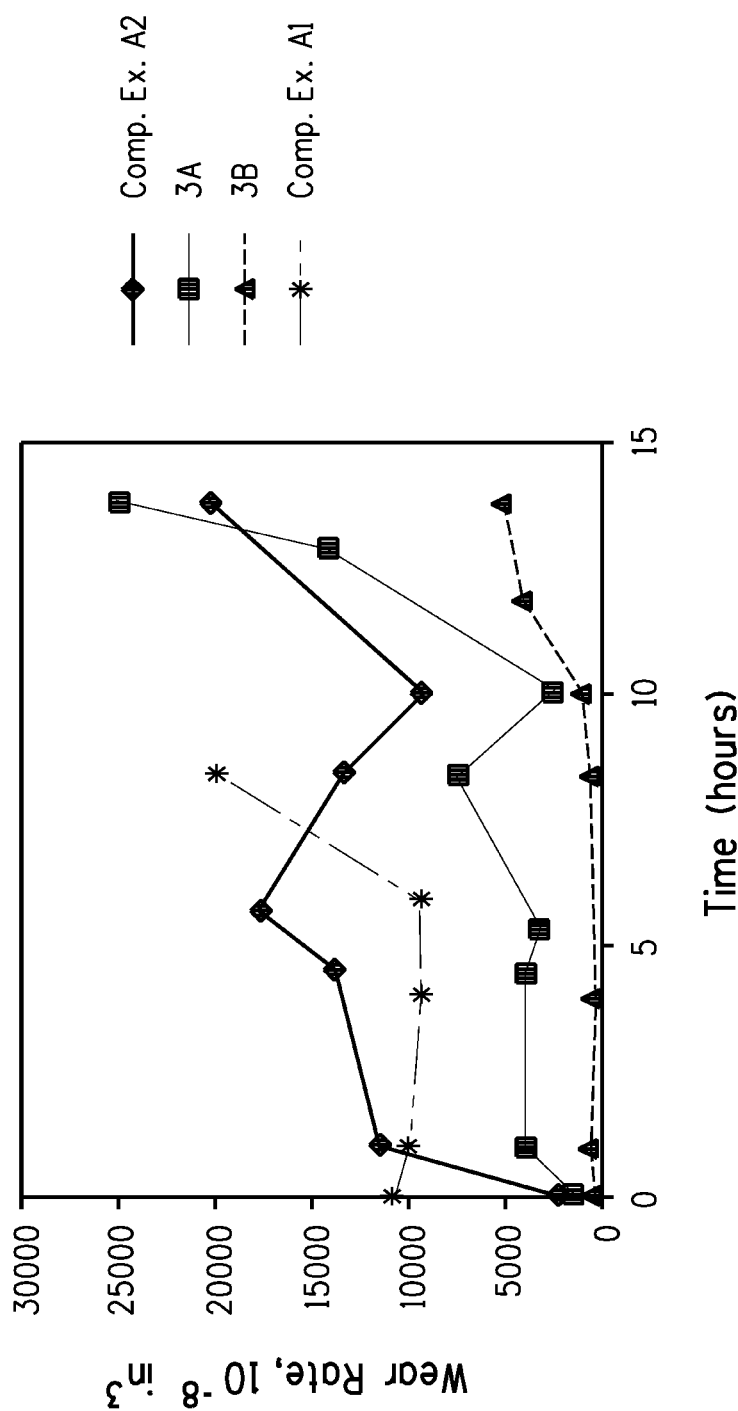
FIG. 2 is a plot of isothermal aging data for three filled polyimide compositions.

The results of the above tests are illustrated in FIG. 2. In the above tests, multiple pieces of each composition are placed in the heating device at the start of the test, and one piece of each composition is removed at each stated time interval for evaluation, but is not thereafter returned to the heating device. Thes data shown in FIG. 2 indicate that, despite negatively affecting TOS, end-capping resulted in improved high temperature wear resistance in graphite-filled resins and addition of kaolinite further improves wear performance.

Example 3

Preparation of Low Molecular Weight Polyimide (DP 29) by Phthalic Anhydride End-Capping Polymerization and imidization were performed by the method of Example 1, with these ingredients: 20.52 g (190 mmol) PPD, 8.79 g (81.3 mmol) MPD, 79.55 g (270 mmol) BPDA, and 2.00 g (13.5 mmol) phthalic anhydride. This gave a low molecular weight, unfilled polyimide of theoretical degree of polymerization (DP) of 29, according to the Carothers Equation.

Example 4

Preparation of Low Molecular Weight Polyimide (DP 41) by Phthalic Anhydride End-Capping Polymerization and imidization were performed by the method of Example 1, with these ingredients: 20.52 g (190 mmol) PPD, 8.79 g MPD (81.3 mmol), 79.55 g (270 mmol) BPDA, and 1.20 g (8.1 mmol) phthalic anhydride. This gave a low molecular weight, unfilled polyimide of theoretical degree of polymerization of 41, according to the Carothers Equation.

Example 5

Low-Temperature Wear of Blends of End-Capped Low Molecular Weight Polyimide with Uncapped Polyimide Uncapped polyimide prepared as in Comparative Example A, but unfilled, was dry blended with each of the low molecular weight, unfilled, end-capped polyimides prepared by the methods of Examples 3 and 4. The polyimides were combined using a Wiley mill to provide an intimate blend of the two components in the weight ratios specified in Table 2. The intimate blends were each fabricated into test specimens for evaluation of wear at 800° F. (427° C.) and 475° F. (246° C.) according to Test Method A. The results are tabulated below in Table 2. The blends showed improved wear at the lower temperature.

TABLE 2

| Low molecular weight polyimide | Weight ratio, low MW PI to high MW PI | Wear volume at 800° F. (427° C.), $10^{-8}$ in$^3$ ($10^{-7}$ cm$^3$) | Wear volume at 475° F. (246° C.), $10^{-8}$ in$^3$ ($10^{-7}$ cm$^3$) |
|---|---|---|---|
| 41 DP | 1:3 | 5828 (9550) | NA |
| 41 DP | 1:6 | 5954 (9757) | 248 (406) |
| 29 DP | 1:5 | 6785 (11119) | 288 (472) |
| 29 DP | 1:10 | 6411 (10506) | 248 (406) |
| None (control) | 0 | 3280 (5375) | 421 (690) |

Example 6

Vibratory Test of Relative Wear

Samples of resins 6A and 6B were prepared in the manner as set forth above for, respectively, the resin of Example 1 and the resin of Sample 3A. A sample of the resin of Comparative Example A was also prepared as a control. These three resins were fabricated into cylindrical bushings (in the manner set forth, for example, in U.S. Pat. No. 4,360,626) as test specimens. The test specimens were subjected to the vibratory wear test of Test Method B at 750° F. (399° C.) for 25 hours. Wall wear for Resins 6A and 6B, as the percent improvement versus the control (Comp. Ex. A), is presented in Table 3.

TABLE 3

| Resins | End cap (1 mol per 100 mols BPDA) | Wall wear improvement (percent) |
|---|---|---|
| 6A | tetrabromophthalate | 22 |
| 6B | phthalate | 18 |

Where a range of numerical values is recited herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, where an embodiment of the subject matter hereof is stated or described as comprising, including, containing, having, being composed of or being constituted by or of certain features or elements, one or more features or elements in addition to those explicitly stated or described may be present in the embodiment. An alternative embodiment of the subject matter hereof, however, may be stated or described as consisting essentially of certain features or elements, in which embodiment features or elements that would materially alter the principle of operation or the distinguishing characteristics of the embodiment are not present therein. A further alternative embodiment of the subject matter hereof may be stated or described as consisting of certain features or elements, in which embodiment, or in insubstantial variations thereof, only the features or elements specifically stated or described are present.

In this specification, unless explicitly stated otherwise or indicated to the contrary by the context of usage, (a) amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value;

(b) all numerical quantities of parts, percentage or ratio are given as parts, percentage or ratio by weight;

(c) use of the indefinite article "a" or "an" with respect to a statement or description of the presence of an element or feature of this invention, does not limit the presence of the element or feature to one in number; and (d) the words "include", "includes" and "including" are to be read and interpreted as if they were followed by the phrase "without limitation" if in fact that is not the case.

What is claimed is:

1. A method of preparing a wear resistant polyimide, comprising (a) end-capping, with phthalic anhydride, or a derivative of phthalic anhydride, as represented by the structure of the following Formula (IV)

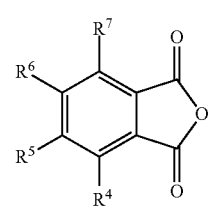

IV wherein $R^4$, $R^5$, $R^6$, and $R^7$ are each independently H, Br, Cl, F, alkyl, alkoxy, or fluoroalkyl, a rigid aromatic polyimide having a degree of polymerization ("DP") of less than about 50 to form an end-capped polyimide; and (b) admixing the end-capped polyimide with an uncapped, rigid aromatic polyimide having a DP of greater than about 60, in a ratio of about 1 part end-capped polyimide to about 3 to about 10 parts uncapped polyimide by weight.

2. A method according to claim 1 wherein the DP of the end-capped polyimide is in the range of about 20 to about 50.

3. A method according to claim 1 wherein the DP of the uncapped polyimide is in the range of about 80 to about 120.

* * * * *